Patented Aug. 9, 1938

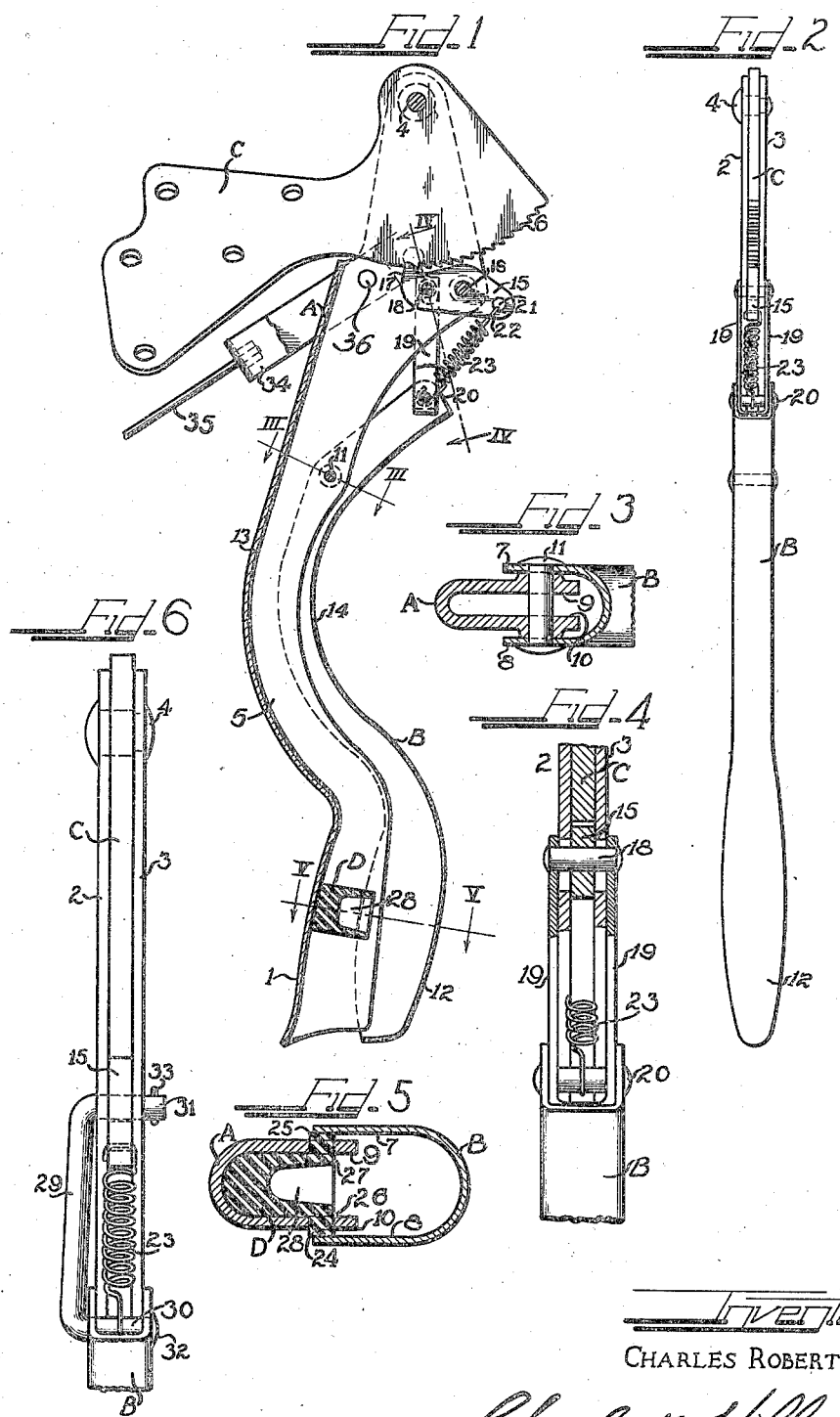

2,126,371

UNITED STATES PATENT OFFICE 2,126,371

BRAKE LEVER

Charles Robert Duncan, Waukegan, Ill., assignor to Oakes Products Corporation, North Chicago, Ill., a corporation of Michigan Application November 19, 1936, Serial No. 111,572

9 Claims. (Cl. 74—537)

The present invention relates to brake levers, and more particularly although not exclusively, to brake levers of the dash type, having novel means for causing operation of the pawls.

An object of the present invention is to provide improved means for operating the pawl of a ratchet type brake lever.

Another object of the present invention is to provide linkage connections between the operating handle and pawl of a brake level construction.

A further object of the present invention is to provide linkage and spring connections between the operating handle and pawl of a brake lever construction.

A still further object of the present invention is to improve brake lever constructions generally.

Above, other and further objects of the present invention will be apparent from the following description and accompanying drawing.

The accompanying drawing illustrates embodiments of the present invention and the views thereof are as follows:

Figure 1 is a longitudinal sectional view, with the attaching bracket in elevation, of a brake lever embodying principles of the present invention.

Figure 2 is an elevational view of the brake lever arrangement of Figure 1, looking towards the right hand edge of the lever of Figure 1.

Figure 3 is an enlarged transverse sectional view taken substantially in the plane indicated by line III—III of Figure 1.

Figure 4 is an enlarged vertical sectional view taken substantially in the plane indicated by line IV—IV of Figure 1.

Figure 5 is an enlarged transverse sectional view taken substantially in the plane indicated by line V—V of Figure 1, and Figure 6 is a fragmental edge elevational view showing another embodiment of the present invention.

The drawing will now be explained.

The form of lever chosen to exemplify the present invention is illustrated as of the dash type, and is constructed of a brake lever proper and a latch release lever or operating handle, of double stamping type, with the stampings substantially U-shaped in cross section and assembled with the walls of one snugly overlapping the walls of the other, and pivoted together so that the operating handle may rock on its pivotal connection with the brake lever proper, in a manner to unlatch the pawl from engagement with its cooperating ratchet.

The brake lever proper A is fashioned from sheet metal, by stamping or any other suitable manner, into cross-sectional shape of substanially U formation, and is bent in its length to offset the grip portion 1 of the lever with respect to the other end of the same. The other end of the lever is fashioned with spaced legs 2 and 3 which are apertured to receive a pivot pin 4 for pivotally connecting the lever to an attaching bracket C.

In the bending or shaping of the lever A, a curved portion 5, is formed. The purpose of this curved portion is to enable movement of the lever, in brake applying direction, so that the curved portion may escape contact with the lower margin of an instrument board of the vehicle, when the lever is mounted as one of the dash type.

The dash type brake lever is mounted on a bracket, which is secured to the dash board of an automotive vehicle, and when in released position, which is the position of Figure 1, lies behind the plane of the surface of the instrument board so as to be out of the way.

A lower margin of the bracket C is notched with a series of teeth 6, forming a ratchet.

The operating handle B is fashioned from sheet metal stock, substantially U shaped in cross section, and curved generally in its length to conform to the curvature of the brake lever proper A. In assembling the operating handle on the lever A the side walls 7 and 8 overlap the corresponding side walls 9 and 10 of the lever A with a snug fit so as to prevent undue relative movement between them. The operating handle B is pivoted to the lever A by means of a suitable pin 11 passing through registering apertures in the walls of the parts A and B.

The operating handle B is provided with a grip portion 12 which is curved longitudinally and laterally, to afford a smooth and comfortable grip.

It will be observed that in the assembly of the parts A and B, the webs 13 and 14 of the parts A and B are in opposed relationship. That is to say the parts A and B are assembled in such manner as to cooperate to close the openings along the length of the parts and thus make an attractive article of manufacture.

A pawl 15 is pivoted to the lever A by a pin 16 which passes through a suitable aperture in the pawl 15, which aperture is between the ends of the pawl. Formed at one end of the pawl is a detent 17 adapted to cooperate with the notches or teeth 6 in the ratchet to thereby latch the lever in any desired position. The end of the pawl adjacent the detent 17 is apertured to receive a pin 18 to which are connected similar ends of link members 19, two of them being shown, one on each side of the pawl. The other ends of the link members 19 are connected to the operating handle B by means of a pivot pin 20.

The other end of the pawl is apertured at 21 through which aperture projects one end 22 of a spring 23, the other end of the spring being hooked over the pin 20, as may be observed in Figures 1, 2, and 4. The spring 23 is under tension, when the parts are assembled and its function is to maintain the pawl in engagement with the ratchet and also to normally maintain the operating handle B in one position.

It will be observed that the links 19 and spring 23 are coincidentally attached to the operating handle B.

In order to prevent rattling between the parts A and B, any suitable means may be employed.

The means chosen to prevent rattling, in the illustrated embodiment of the present invention, comprises a button D of elastic material, such as rubber or rubber composition, which is fashioned to conform to the interior of one of the parts, illustrated herein as conforming to the interior of the grip portion 1 of the brake lever proper A. The button D is provided with outstanding projections 24 and 25, on opposite sides of the body of the button, which extend through apertures 26 and 27 formed in the side walls 10 and 9, respectively, of the part A. The projections 24 and 25 are fashioned to extend beyond the outer surfaces of the walls 9 and 10 of the part A, and to bear against the inner surfaces of the walls 7 and 8 of the operating handle B and thus serve as cushion means for preventing rattling between the parts A and B. The button D is shown as having a hollow portion 28 which is provided to increase the flexibility of the button where its projections 24 and 25 contact the walls of the operating handle B thereby more effectively preventing rattle of the parts A and B.

Figure 6 shows another form of the present invention wherein the links 19 are eliminated and a U shaped pin 29 has ends 30 and 31 parallel to each other and in angular relation to the body of the pin, with the end 30 passing through the pin aperture in the adjacent end of the operating handle B and the end portion 31 passing through the aperture in the pawl adjacent the detent 17 of the pawl. When the link or pin 29 is utilized, after the end portion 30 is passed through the apertures in the walls of the operating member B adjacent the pawl, it may be headed over as at 32 to secure this end of the pin in place. The other end 31 of the pin may be provided with a hole to receive a cotter key 33, or like means to prevent disengagement of the end portion 31 of the pin with respect to the pawl 15.

Figure 1 illustrates the relative position of the several parts when the lever is in set position with the pawl 15 in engagement with any of the notches 6 of the ratchet. When it is desired to move the lever from the position of Figure 1, to apply the brakes, the grip 1 of the lever proper A is grasped and the lower end is swung in counter-clockwise direction, during which movement the detent 17 of the pawl rides over the notches of the ratchet until the hold on the grip portion of the lever A is released, whereupon the detent 17 of the pawl will engage in the nearest tooth of the ratchet to thus latch the brake lever in such position.

To release the lever, it is given a slight pull in counter-clockwise direction and the grip 12 of the operating handle B is squeezed toward the grip portion 1 of the part A which movement raises the detent 17 of the pawl out of its then engaged notch of the ratchet, whereupon the lever may be moved in clockwise direction to released or off position, which is that shown in Figure 1.

It will be observed that the pawl 15 is operated by means of connections between the operating handle B and the pawl, one of which connections comprises resilient means adapted to normally hold the pawl in latching engagement with the ratchet and the operating handle in one position and the other of which connections is adapted on movement of the operating handle from its one position to unlatch the pawl from its ratchet.

The construction and assembly of the parts is such that but slight movement of the grip portion 12 of the operating handle B is necessary to unlatch the pawl from engagement with the ratchet, thereby providing a brake lever which is easy to operate and which may be readily released from latched position without requiring excessive gripping action against the grip portion of the operating handle B.

A connection, in the form of a yoke 34 for the pull cable or rod 35 of the brake mechanism, is shown as connected to the lever by means of a suitable connection such as pin 36. It is understood, however, that the connection could be made elsewhere, if desired.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Brake lever construction including a brake lever proper and an operating handle, said lever proper and said handle being stampings of substantially U shape in cross section and the two being assembled with the walls of one snugly overlapping the walls of the other and with the webs in opposition, said lever and handle being pivoted together, a pawl pivoted to said lever proper at a point between the ends of the pawl, said pawl having a detent at one end to engage a ratchet, a pin carried by said operating handle, link means connecting the detent end of said pawl to said pin, and spring means connecting the other end of said pawl to said pin.

2. Brake lever construction including a brake lever proper and an operating handle, said lever proper and said handle being stampings of substantially U shape in cross section and the two being assembled with the walls of one snugly overlapping the walls of the other and with the webs in opposition, said lever and handle being pivoted together, a pawl pivoted to said lever proper at a point between the ends of the pawl, said pawl having a detent at one end to engage a ratchet, a pin carried by said handle, and link and spring connections between said pin and said pawl.

3. Brake lever construction including a brake lever proper and an operating handle, said lever proper and said handle being stampings of substantially U shaped in cross section and the two being assembled with the walls of one snugly overlapping the walls of the other and with the webs in opposition, said lever and handle being pivoted together, a pawl pivoted to said lever proper at a point between the ends of the pawl, said pawl having a detent at one end to engage a ratchet, link means connecting the detent end of said pawl to said operating handle, and spring means connecting the other end of said pawl to said operating handle, and anti-rattle means between said lever proper and said operating handle.

4. A brake lever of stamped sheet metal of substantially U shape in cross section and bent in elevation to offset the grip portion of the handle with respect to its pivot end, an operating handle of stamped sheet metal of substantially U shape in cross section and bent in elevation to conform generally to the bent brake lever, said lever and operating handle being pivoted together with the walls of one snugly overlapping the walls of the other and with their webs in opposition, means within said lever and operating handle to prevent rattle, a pawl pivoted to said brake lever between the ends of the pawl, connections between the operating handle and both ends of the pawl, one of said connections comprising resilient means adapted to normally hold said pawl in latching engagement with the ratchet and the operating handle in one position, and the other of said connections adapted on movement of said operating handle from said one position to unlatch the pawl from its ratchet.

5. A brake lever of stamped sheet metal of substantially U shape in cross section and bent in elevation to offset the grip portion of the handle with respect to its pivot end, an operating handle of stamped sheet metal of substantially U shape in cross section and bent in elevation to conform generally to the bent brake lever, said lever and operating handle being pivoted together with the walls of one snugly overlapping the walls of the other and with their webs in opposition, a pawl pivoted to said brake lever between the ends of the pawl, connections between the operating handle and both ends of the pawl, one of said connections comprising resilient means adapted to normally hold said pawl in latching engagement with the ratchet and the operating handle in one position, and the other of said connections adapted on movement of said operating handle from said one position to unlatch the pawl from its ratchet.

6. Brake lever construction including a lever element and a pawl operating element, said elements being formed as stampings of channel shape in cross section and assembled and pivoted together with the walls of one element snugly overlapping the walls of the other element, and resilient means projecting through the lapped walls and bearing against the lapping walls to prevent occurrence of rattle between said elements.

7. Brake lever construction including a lever element and a pawl operating element, said elements being formed as stampings of channel shape in cross section and assembled and pivoted together with the walls of one element overlapping the walls of the other element, and elastic means projecting through one wall in contact with another wall and effective between the lapped and lapping walls to prevent rattle of the elements.

8. An emergency brake control mechanism comprising a support having a plurality of teeth formed along an arcuate margin of the same, a lever member formed of sheet metal and of U-shaped configuration throughout a major portion of its length and having side wall portions projecting at one end and straddling said support and pivotally connected to it, said lever member having a grip portion formed at the other end and angularly disposed with respect to said lever member, a pawl carried by said lever member arranged for cooperation with the teeth of said support, a pawl release member of substantially U-shape in cross section throughout a major portion of its length pivoted to said lever member with the side walls of said release member overlapping the side walls of the lever member, link means connecting said pawl to the adjacent end of said release member, said link means lying inside the side walls of the release member and outside the side walls of the lever member, and spring means connected to said pawl and to the adjacent end of said release member for normally maintaining said release member in one position and said pawl in latched engagement with a tooth of said support.

9. An emergency brake control mechanism comprising a support having a plurality of teeth formed along an arcuate margin of the same, a lever member formed of sheet metal and of U-shaped configuration throughout a major portion of its length and having side wall portions projecting at one end and straddling said support and pivotally connected to it, said lever member having a grip portion formed at the other end, a pawl carried by said lever member arranged for cooperation with the teeth of said support, a pawl release member of substantially U-shape in cross section throughout a major portion of its length pivoted to said lever member with the side walls of said release member and said lever member overlapping, link means connecting said pawl to the adjacent end of said release member, said link means lying inside the side walls of one of said members and outside the side walls of the other of said members, and spring means connecting said pawl and the adjacent end of said release member for normally maintaining said release member in one position and said pawl in latched engagement with a tooth of said support.

CHARLES ROBERT DUNCAN.